United States Patent
Ditlow et al.

(10) Patent No.: US 7,305,674 B2
(45) Date of Patent: Dec. 4, 2007

(54) METHOD AND APPARATUS TO MANAGE MULTI-COMPUTER SUPPLY

(75) Inventors: Gary Ditlow, Garrison, NY (US); Daria Rose Dooling, Huntington, VT (US); David Erin Moran, South Burlington, VT (US); Thomas Wood Wilkins, Shelburne, VT (US); Ralph James Williams, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 1190 days.

(21) Appl. No.: 09/943,829

(22) Filed: Aug. 31, 2001

(65) Prior Publication Data

US 2003/0078955 A1 Apr. 24, 2003

(51) Int. Cl.
*G06F 9/45* (2006.01)
*G06F 15/16* (2006.01)

(52) U.S. Cl. ..................... 718/100; 709/201

(58) Field of Classification Search ........ 718/100–108; 709/201
See application file for complete search history.

(56) References Cited

U.S. PATENT DOCUMENTS

| | | | |
|---|---|---|---|
| 5,708,832 A | 1/1998 | Inniss et al. | |
| 5,727,211 A * | 3/1998 | Gulsen | 718/108 |
| 5,754,829 A | 5/1998 | Motohiro et al. | |
| 5,845,627 A | 12/1998 | Olin et al. | |
| 5,928,328 A | 7/1999 | Komori et al. | |
| 5,930,773 A | 7/1999 | Crooks et al. | |
| 6,016,503 A * | 1/2000 | Overby et al. | 718/104 |
| 6,105,053 A * | 8/2000 | Kimmel et al. | 718/105 |
| 6,370,560 B1 * | 4/2002 | Robertazzi et al. | 718/105 |
| 6,400,996 B1 * | 6/2002 | Hoffberg et al. | 700/83 |
| 6,601,084 B1 * | 7/2003 | Bhaskaran et al. | 718/105 |
| 6,925,641 B1 * | 8/2005 | Elabd | 718/101 |
| 2001/0054094 A1 * | 12/2001 | Hirata et al. | 709/223 |
| 2002/0059625 A1 * | 5/2002 | Kurauchi | 725/91 |

OTHER PUBLICATIONS

Ditlow, et al, Partitioning and Lead Balancing Graphical Shape Data for Parallel Applications, United States Pending Patent Application.

* cited by examiner

*Primary Examiner*—Meng-Al T. An
*Assistant Examiner*—Kenneth Tang
(74) *Attorney, Agent, or Firm*—Richard M. Kotulak, Esq.; McGinn IP Law Group, PLLC

(57) ABSTRACT

A method and structure for determining a listing of host processors on a network to perform a parallel application, including determining a listing of all possible hosts on the network for performing the parallel application, determining for each of the possible hosts a current capacity and a current utilization, calculating for each of the possible hosts a difference between the current capacity and the current utilization, and selecting from the listing of all possible hosts a listing of hosts based on sorting the calculated differences.

17 Claims, 11 Drawing Sheets

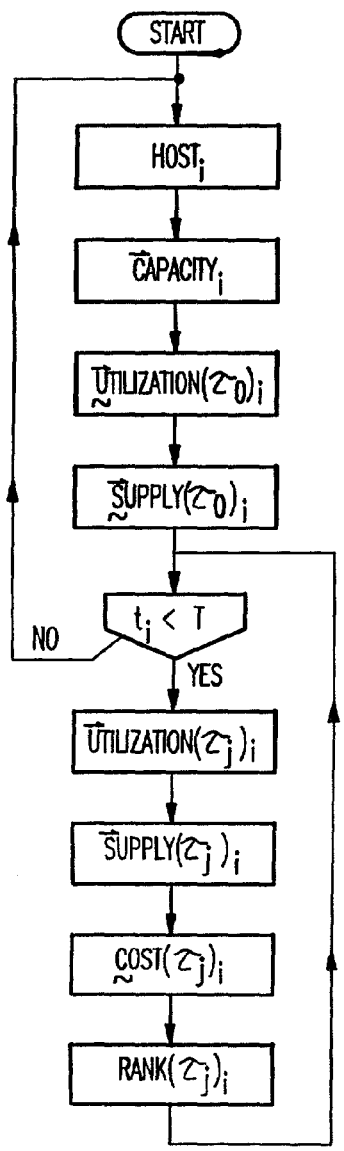

$$\vec{HOSTS}_i \quad \text{WHERE} \begin{cases} \text{DIMENSION: } 0 \leq \vec{HOST}(i) \leq \vec{SERVER}(N) \\ \text{UNIT SCALAR} \\ \text{FORM: TIME INDEPENDENT VECTOR}(i) \\ \quad 0 \leq i < M \leq N \end{cases} \quad [1]$$

$$\vec{CAPACITY}_i = (CPU, MEMORY, TEMP\ FILE, CACHE\ PAGE)_i \quad [2]$$

$$\text{WHERE} \begin{cases} \text{DIMENSIONS: CPU, DATA, DATA, DATA} \\ \text{UNITS: SCALAR, BYTE, BYTE, BYTE} \\ \text{FORM: TIME INDEPENDENT, } i \times 4 \text{ MATRIX} \end{cases}$$

$$\vec{UTILIZATION}(t_0)_i = (CPU, MEM, TMP, PAGE)(t_0)_i \quad [3]$$

$$\text{WHERE} \begin{cases} \text{DIMENSIONS: CPU, DATA, DATA, DATA} \\ \text{UNITS: SCALAR, BYTE, BYTE, BYTE} \\ \text{FORM: TIME DEPENDENT, } i \times 4 \text{ MATRIX} \end{cases}$$

$$\vec{SUPPLY}(\tau_0)_i = \vec{CAPACITY}_i - \vec{UTILIZATION}(\tau_0)_i \quad [4]$$

$$\text{WHERE} \begin{cases} \text{DIMENSIONS: CPU, DATA, DATA, DATA} \\ \text{UNITS: SCALAR, BYTE, BYTE, BYTE} \\ \text{FORM: TIME DEPENDENT, } i \times 4 \text{ MATRIX} \end{cases}$$

WHERE $0 \leq \tau_j \leq$ SAMPLING PERIOD T $$\vec{UTILIZATION}(\tau_j) \quad [3a]$$

$$\vec{SUPPLY}(\ )_i = (\vec{CAPACITY}_i - \vec{UTILIZATION}(\tau_j)_i) \quad [4a]$$

$$\vec{COST}_i = 1 - \int \vec{SUPPLY}(\tau_j)_i \, dj \quad [5a]$$

$$\text{WHERE} \begin{cases} \text{DIMENSION: NONE, NONE, NONE, NONE} \\ \text{UNITS: SCALAR, SCALAR, SCALAR, SCALAR} \\ \text{FORM: TIME DEPENDENT VECTOR }(t_j)_i \end{cases}$$

$$\vec{RANK}(t_j)_i = SORT[\vec{VALUE}(t_j)_i] \quad [6a]$$

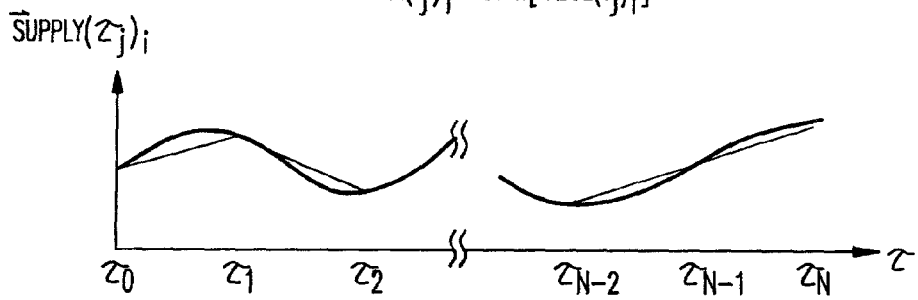

FIG. 7

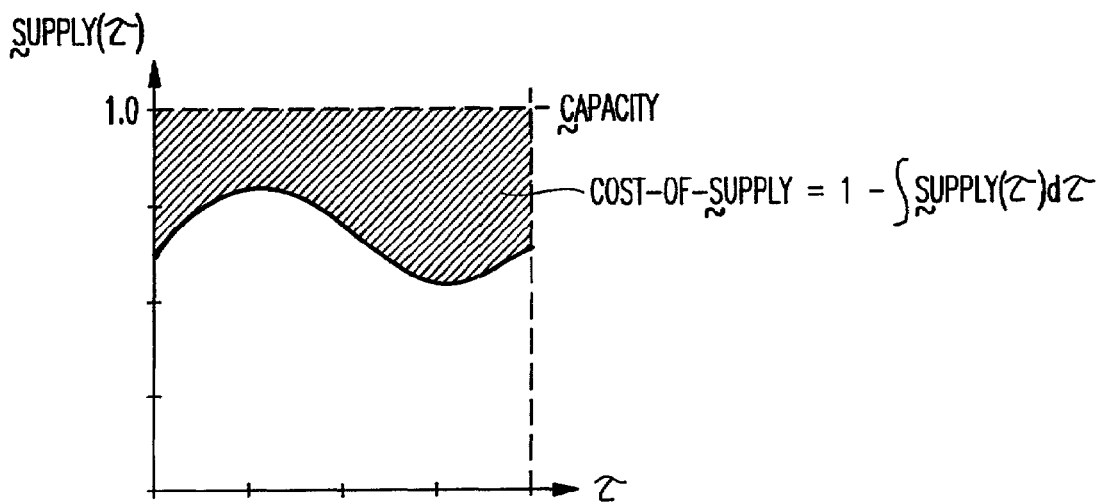
FIG.7E
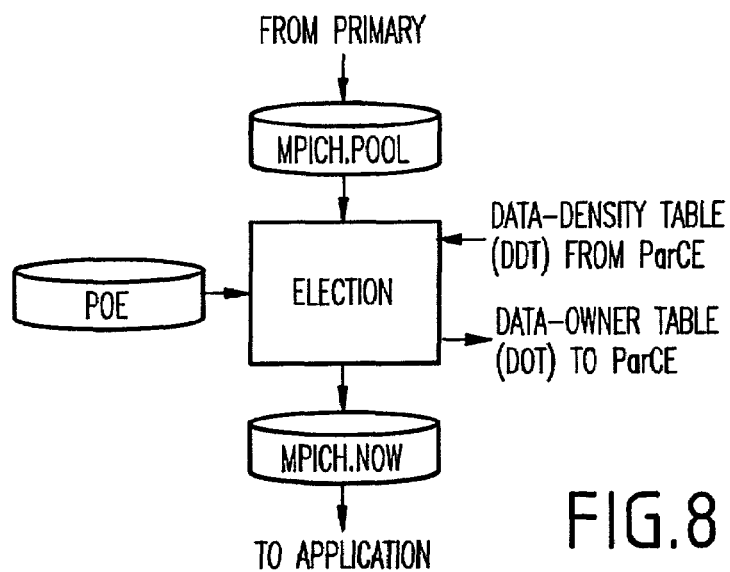
FIG.7F
FIG.8

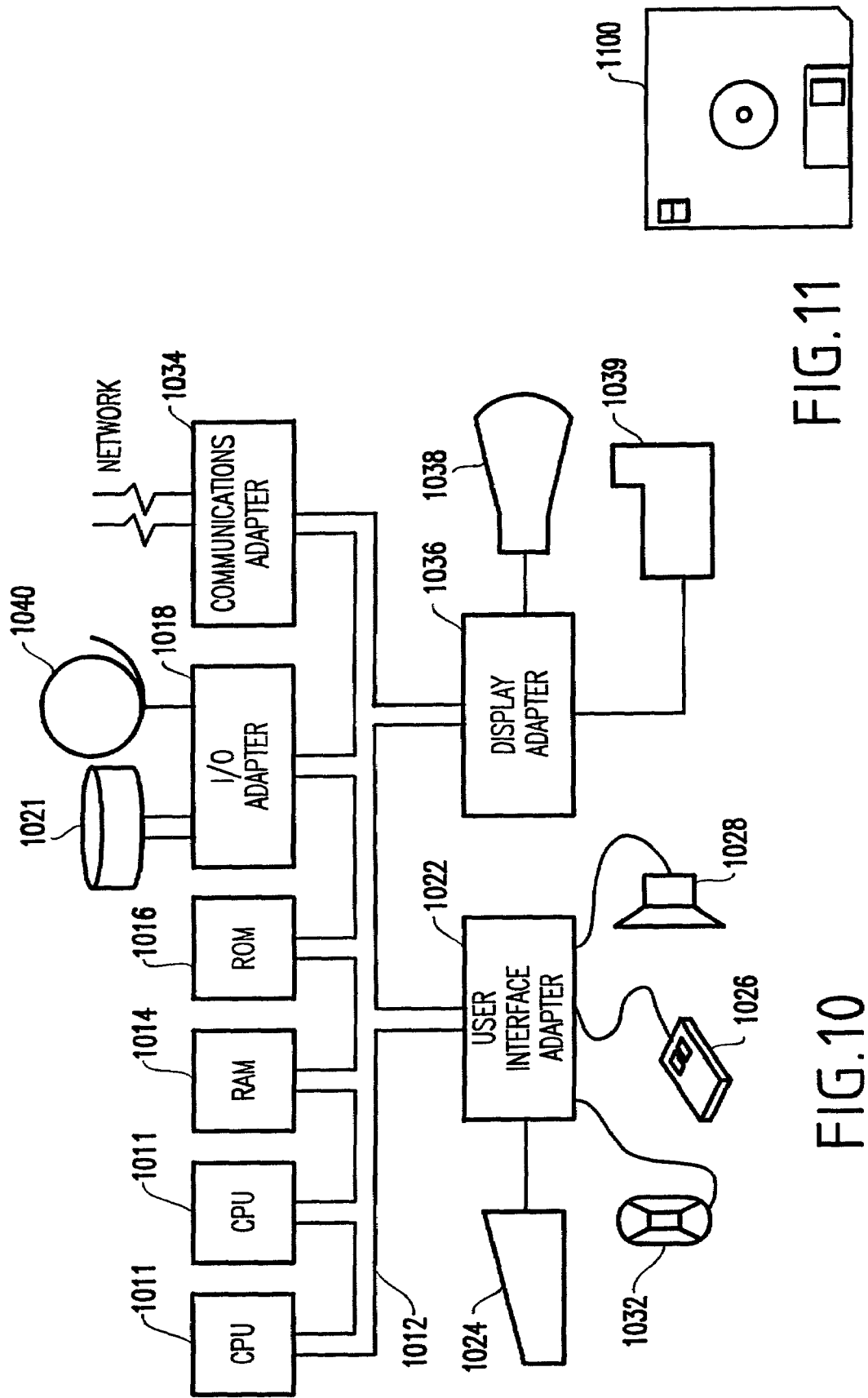

METHOD AND APPARATUS TO MANAGE MULTI-COMPUTER SUPPLY

BACKGROUND OF THE INVENTION

1. Field of the Invention

The present invention relates generally to managing computer resources within a network for parallel processing. Specifically, an economics model is used to tabulate resources, receive a demand, and produce a listing of one or more computers to satisfy the demand based on which computers currently have the largest reserve.

2. Description of the Related Art

The present invention is related to quantifying the supply of computational resources of a uni- or multi-computer. For each such computer these computational resources typically include at least one central processing unit (CPU), memory, temporary file space, and cache memory paging space. A uni-computer is considered herein as meaning a combination of computational resources contained in a single enclosure and typically connected to a local-area network (LAN) or a wide-area network (WAN). A multi-computer can be a "parallel" computer composed of several tightly coupled computers in a single enclosure or a "distributed" group of uni-computers that is loosely coupled via a LAN or WAN.

Multi-computer processing, hereinafter called multi-processing, involves the use of multiple computers to process a single computational task such as an application program. The term generally refers to the use of a parallel or a distributed computer. The programming of either a parallel or a distributed computer generally is referred to as "parallel programming."

Multi-processing is supported by the use of the Message Passing Interface (MPI), which is a communication library. The defining feature of the message-passing model is that the transfer of data from the memory of one or more computers to the local memory of another one or more computers requires operations to be performed by all of the computers involved. Two versions of MPI software are generally available. First, the IBM Parallel Operating Environment (POE) is a licensed IBM product. Second, the Portable Implementation of MPI (MPICH) is publicly available and can be used on any computer since it does not require a license. In fact, MPICH can be used on a computer that has POE installed. Thus the number of computers available for multi-processing on a given network is larger if MPICH is used to support MPI rather than POE. However, both MPI and POE require a computer with UNIX or UNIX-like operating system, such as IBM AIX.

There are at least three advantages and motivations for using multi-computing. First, the potentially enormous demand for the computer resources of processor, memory, temporary file, and cache page that can be made by a computational task is divided among multiple computers. Second, the time required to complete a variety of scientific and engineering applications is scaled down by the number of processors used. Third, the reliability of completing such programs is increased because of the shortened processing time. The first of these reasons is the most important, since without sufficient resources no time-scaling is possible.

SUMMARY OF THE INVENTION

The description of the present invention includes a definition of a multi-computer system and multi-computer data processing. A system is defined as a region of space chosen for study, and is described by its properties and their associated dimensions and units. For the purpose of the present invention, this system is a computer system that is described by four properties: central processing unit (CPU), main memory, temporary file space, and cache memory page space. For example, a given computer may have four CPUs, 256 mega-bytes of main memory, 500 mega-bytes of temporary file space, 125 mega-bytes of cache memory page space. Temporary file space is a disk drive that is housed within the given computer. Cache memory page space is secondary memory that is physically nearby or within the CPU. Furthermore, this system may be comprised of several or many such computers, either parallel or distributed, thereby being a multi-computer. Properties, in turn, are described by their dimensions and their corresponding dimensional units.

The present invention models a computer network in terms of these four properties of each computer and uses economic concepts to generate a listing of processors that are currently the most suitable to serve as the processors in a parallel application. In particular, this invention teaches a method and apparatus to tabulate a description of these resources, receive a specification of the computational demand of a uni- or multi-computer application, then produce a list of one or more computers to satisfy this specified demand.

An overview of the invention can be seen in the left side of FIG. 1, wherein is shown the file (named "Servers") 10 of all resources available in the network for executing a parallel application 11. A server is any data processor attached to the subject network. A server can be a printer, a personal computer, a fax machine, a UNIX workstation, etc. A host is a UNIX workstation that will accept commands from the network. Module 12 (called "Supply") generates an output file 13 (called "Pool") which lists the resources selected by Supply 12 for executing the parallel application 11.

It should be understood that the present invention itself does not actually execute the target parallel application 11. Rather, the present invention provides a technique to select network resources most suitable for this parallel processing execution. In a preferred embodiment of the invention, the selection of network resources is itself a parallel processing application and is executed concurrently with the target parallel application. The output of the present invention is an output file 13 listing the selected resources. This output file 13 becomes the input to another operating system or operating system level that is controlling the actual execution of the processing of the target parallel application.

It is, therefore, an object of the present invention to provide an improved structure and method for selecting the computer network components to be the participants in a parallel processing application.

It is another object of the present invention to provide a method of selecting parallel processing participants based upon a determination in each of a time interval of which potential participants in the system are most suitable to participate.

It is another object of the present invention to teach a method of selecting parallel processing participants based on economic concepts of supply and demand.

It is another object of the present invention to teach a method which determines in real time an optimal listing of network resources to execute a multi-processing application.

It is another object of the present invention to teach an implementation of basic economic concepts that can be implemented for improving the execution of a variety of tasks of which the selection of computer network resources to participate in the execution of a parallel processing application is a specific example.

To achieve the above goals and objectives, according to a first aspect of the present invention, herein is described a method of determining a listing of host processors on a network to perform a parallel application, including determining a listing of all possible hosts on the network for performing the parallel application, determining for each of the possible hosts a current capacity and a current utilization, calculating for each of the possible hosts a difference between the current capacity and the current utilization, and selecting from the listing of all possible hosts a listing of hosts based on sorting the calculated differences.

According to a second aspect of the present invention, herein is described a signal-bearing medium tangibly embodying a program of machine-readable instructions executable by a digital processing apparatus to perform the above described method determining a listing of host processors on a network to perform a parallel application including determining a listing of all possible hosts on the network for performing the parallel application.

According to a third aspect of the present invention, herein is described a computer network having a plurality of computation resources and an operating system for executing a target parallel application process using at least a subset of the plurality of computation resources, wherein the network includes the above-described method to determine a listing of the computation resources to perform the target parallel application process.

BRIEF DESCRIPTION OF THE DRAWINGS

The foregoing and other objects, aspects and advantages will be better understood from the following detailed description of a preferred embodiment of the invention with reference to the drawings, in which:

FIG. 7 is a flow diagram illustrating the sequence of calculations of a preferred exemplary embodiment;

FIGS. 7A-7F further illustrate normalization;

FIG. 8 shows interfaces of the Election module of a preferred exemplary embodiment;

FIG. 10 illustrates an exemplary hardware/information handling system 1000 for incorporating the present invention therein; and FIG. 11 illustrates a signal bearing medium 1100 (e.g., storage medium) for storing steps of a program of a method according to the present invention.

DETAILED DESCRIPTION OF A PREFERRED EMBODIMENT OF THE INVENTION

Figure 2:
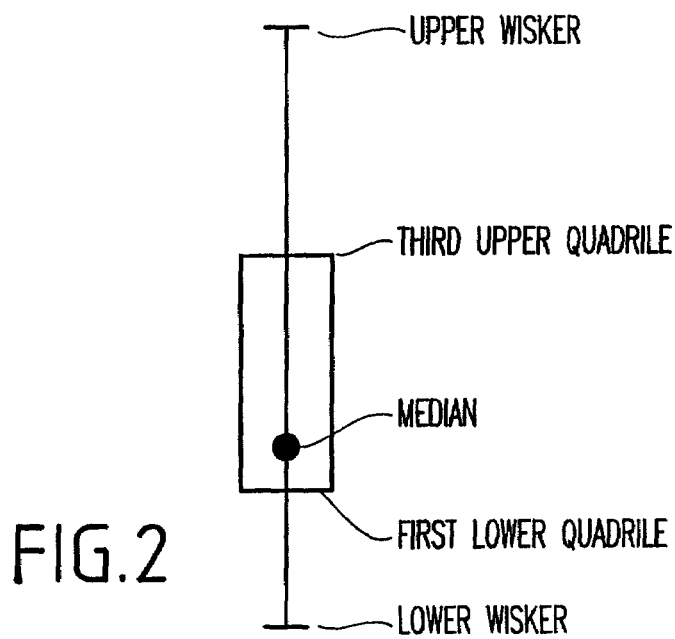
FIG. 2 shows the components of a statistical box diagram.

Referring briefly now to FIG. 2, since all real-world processes exhibit variability, one aspect of the present invention involves statistics. Statistics deals with the collection, analysis, and use of measurements to quantify this variability. For example, a population may consist of the measurements of luminosity of automobile headlamps. This population is referred to as the measurement data. On the other hand, a manufacturer may be interested in whether or not the headlamps meets a specification. This population is referred to as attribute data, in which each headlamp in the sample is assigned a "one" if it meets its luminosity specification and a "zero" if it fails to meet specification.

Descriptive statistics is the branch of statistics that deals with the organization, summation, and presentation of data and can be applied to both the population and its samples. Descriptive statistics methods include measurements of central tendency, measures of dispersion, and grouped data.

In inferential statistics the object is to make a decision about a population. The term population refers to the collection of measurements on all elements of a universe about which conclusions can be drawn. Frequently, the objective of a decision maker is to use the measurements in the sample or population to draw a conclusion or inference. The term sample is simply a subset of the population. The three major types of inferential statistics are point estimation, confidence interval estimation, and hypothesis testing.

A widely used method to determine the central tendency of a sample or population is the median, x_bar, where $$x_{13} \text{ bar} = x_{([n+1]/2)}, \text{ if } x \text{ is odd,} \quad (1)$$

and $$(x_{(n/2)} + x_{([n/2]+1)})/2, \text{ if } x \text{ is even.} \quad (1)$$

Central tendency does not necessarily provide enough insight into measurement data.

Therefore, a second and very important statistical method is that of the measurement of dispersion. A widely used method of dispersion quantification is sample variance. If $x_1, x_2, \ldots x_{n-1}$ is a sample of n samples, then the sample variance is $$s^2 = \left( \sum_{i=1}^{n} (x_1 - \delta)^2 \right) \Big/ (n-1) \quad (2)$$

$$= \left( \sum_{i=1}^{n} x_1^2 - \left( \sum_{i} -1^n x_1 \right)^2 \Big/ n \right) \Big/ (n-1)$$

Taking the positive square root of $s^2$ yields the sample standard deviation s.

The box plot is a form of exploratory data analysis to understand the shape, location, and variability of data. FIG. 2 shows a box diagram that displays the median, first upper- and lower-quartile, and upper- and lower-wiskers. Because the model to be discussed shortly involves a fluctuating system in which variability is inherent, the concepts of median, standard deviation, and box-plots are used in a preferred exemplary embodiment of the present invention.

Additionally, since the present invention embraces a number of basic economic concepts, the following definitions provide a basis for the terminology and equations used in description of the described exemplary implementation of this invention.

A supply schedule shows the amount of a commodity that a producer is willing and able to supply over a period of time at various prices. A graph of the supply schedule is called the supply curve. The supply curve usually slopes upward from left to right because a higher price must be paid to a producer to induce the producer to supply more of a commodity due to the overhead costs of its production. This is to say that the price of a commodity is directly proportional to its supply, a concept commonly called the law of supply.

A demand schedule shows the amount of a commodity that a consumer is willing and able to purchase over a period of time at various prices. A graph of the demand schedule is called the demand curve. The demand curve usually slopes downward from left to right because a lower price induces the consumer to purchase more of a commodity. This is to say that the price of a commodity is inversely proportional to its demand, a concept called the law of demand.

The equilibrium price and equilibrium quantity of a commodity are determined by the intersection of its supply curve and its demand curve, a concept called the law of equilibrium. A graph of the equilibrium schedule is called the equilibrium curve.

Figure 3:
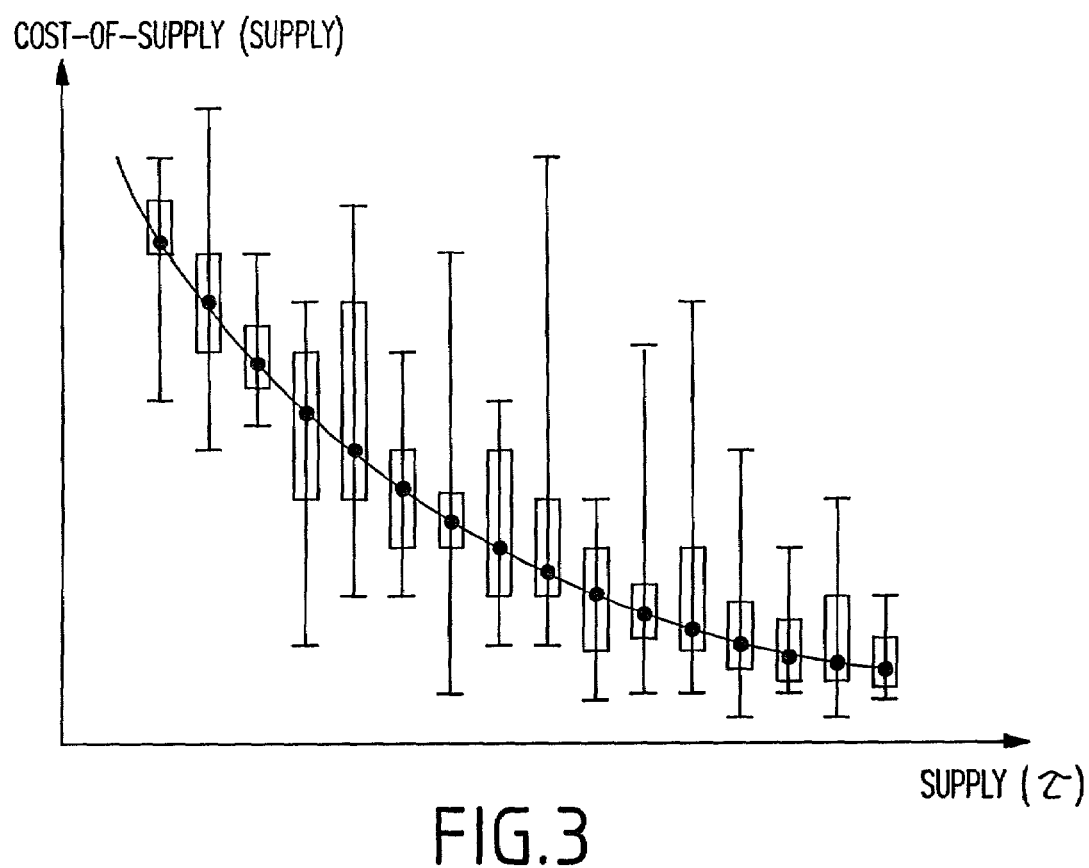
FIG. 3 shows an exemplary cost-of-supply curve based on box diagrams.

The present invention is based on a modification of the above mentioned economic concepts, with one exception. As shown in FIG. 3, unlike the conventional economic supply curve, the supply curve of the present invention slopes downward from left to right, indicating an inverse proportionality between cost and supply. This says that the cost of a resource increases as its supply decreases, as follows:

$$\uparrow \text{Supply} \Rightarrow \downarrow \text{Cost}. \tag{3}$$

Although it is common in economics to refer to price in a supply schedule, where price=cost+profit, there is no notion of profit in the present invention. FIG. 3 also shows a novel metric to be discussed shortly, called the cost-of-supply of multi-computer resources, a unitless, dimensionless number where $$0 \leq \text{cost-of-supply} \leq 1. \tag{4}$$

Much of the present invention involves how the cost-of-supply curve is developed and its value to the overall function of the invention, namely, the quantification of a multi-computer resource supply as a function of time to guarantee that a computational system can meet an application demand. In a preferred embodiment the cost-of-supply curve involves bar chart diagrams as exemplarily shown in FIG. 3.

The best way to explain the meaning of supply in the present invention is by example. An electric generation facility would have a certain capacity to generate electricity, its resource. Unless more generators are added, this capacity is constant over time. The facility itself uses electricity in a quantity that varies over time. Thus, the supply of electricity available at time t would be described by $$\text{supply}(t) = \text{capacity} - \text{utilization}(t), \tag{5}$$

where capacity is measured at initial time=$t_0$ and considered constant over sampling period T. It is also convenient to define a unitless ratio $\tau$, $$\tau = \text{time/period} = t/T, \text{ so that } 0 \leq \tau \leq 1. \tag{6}$$

The equation (5) above says that as utilization increases, supply decreases. Relative to the power station example, this equation has the dimension of power and units of watts. Dimensionality can be eliminated within equation (5) by normalizing the equation by dividing by capacity, $$\text{supply}(\tau) = \frac{\text{capacity} - \text{utilization}(\tau)}{\text{capacity}}. \tag{7}$$

Supply is now dimensionless and unitless. Additionally, since $$0 \leq \text{utilization}(\tau) \leq \text{capacity, then} \tag{8}$$

$$0 \leq \text{supply}(\tau) \leq 1. \tag{9}$$

Figure 4:
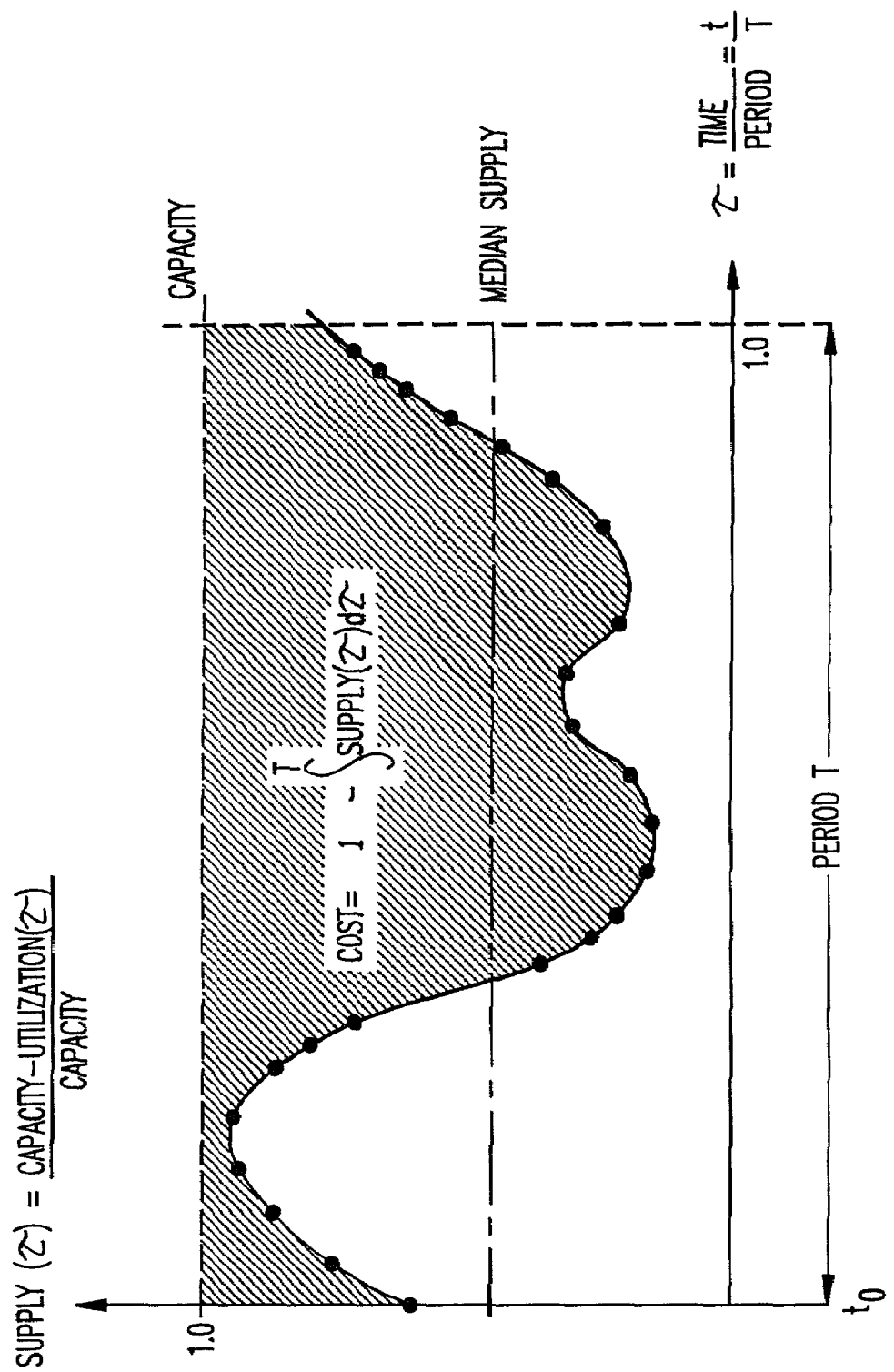
FIG. 4 shows an exemplary supply curve as developed by the present invention.

Relative to equation (7), as shown in FIG. 4, since both the independent variable $\tau$ and the dependent variable supply are both unitless, positive, and less than or equal to one, then the area under the capacity curve is one, since $$(T \times \text{capacity}) = 1 \times 1 = 1. \tag{10}$$

This fact supports the inverse relation shown in equation (3) above and accounts for the "1" that appears in equation (12) below.

Equation (7) applies to any system that consumes some of what it supplies. Other real life examples would include refineries, heaters, car rental agencies where some of the cars are used by employees, and airlines that shuttle their crews. In the present invention, supply refers to the supply of multi-computer resources.

The present invention also proposes that the time-rate-of-change of cost-of-supply is inversely proportional to its resource supply. That is, $$\frac{d(\text{cost-of-supply})}{dt} \propto^{-1} \text{supply}(\tau), \tag{11}$$

which is integrated to evaluate the cost of a host processor over a time period T. Thus, by equation (7)

$$\text{cost-of-supply}(\tau) = 1 - \int_{t_0}^{T} \text{supply}(\tau) d\tau \tag{12}$$

As shown in FIG. 4, the area under the utilization curve equals one, and so the cost-of-supply is the area above the supply curve and below the utilization curve, so that $$0 \leq \text{cost-of-supply} \leq 1. \tag{13}$$

The dimension of cost-of-supply is unitless.

While FIG. 4 shows the supply function as continuous, in the real world it actually is discrete and made up of samples taken at various times over a sampling period T. Of course, if desired, the value of the function between the sample points could be determined by interpolation. As shown in FIG. 4, in a preferred embodiment, the median of the supply function for the interval T is also calculated, as well as the variance. The integration step size need not be constant, and there are many numerical functions available to perform the integration.

The cost-of-supply function works as follows. If supply is low, then the area above the supply curve and below the capacity line is large, and, thus, the cost-of-supply is high.

On the other hand, if the supply is high, then the area above the supply is low so that the cost-of-supply is small.

Another feature of a preferred embodiment of the invention is its use of the median value, as defined by equation (1) above. The median is used as a preferred method to measure the activity of the supply function, which can have quite dramatic swings over time. In other words, using the instantaneous cost-of-supply as a means to rank hosts could be misleading if a sudden change is possible. To protect against this effect, a check of the difference between instantaneous supply($\tau$) and the median of supply would provide some assurance that a supplier is behaving as expected.

Figure 1:
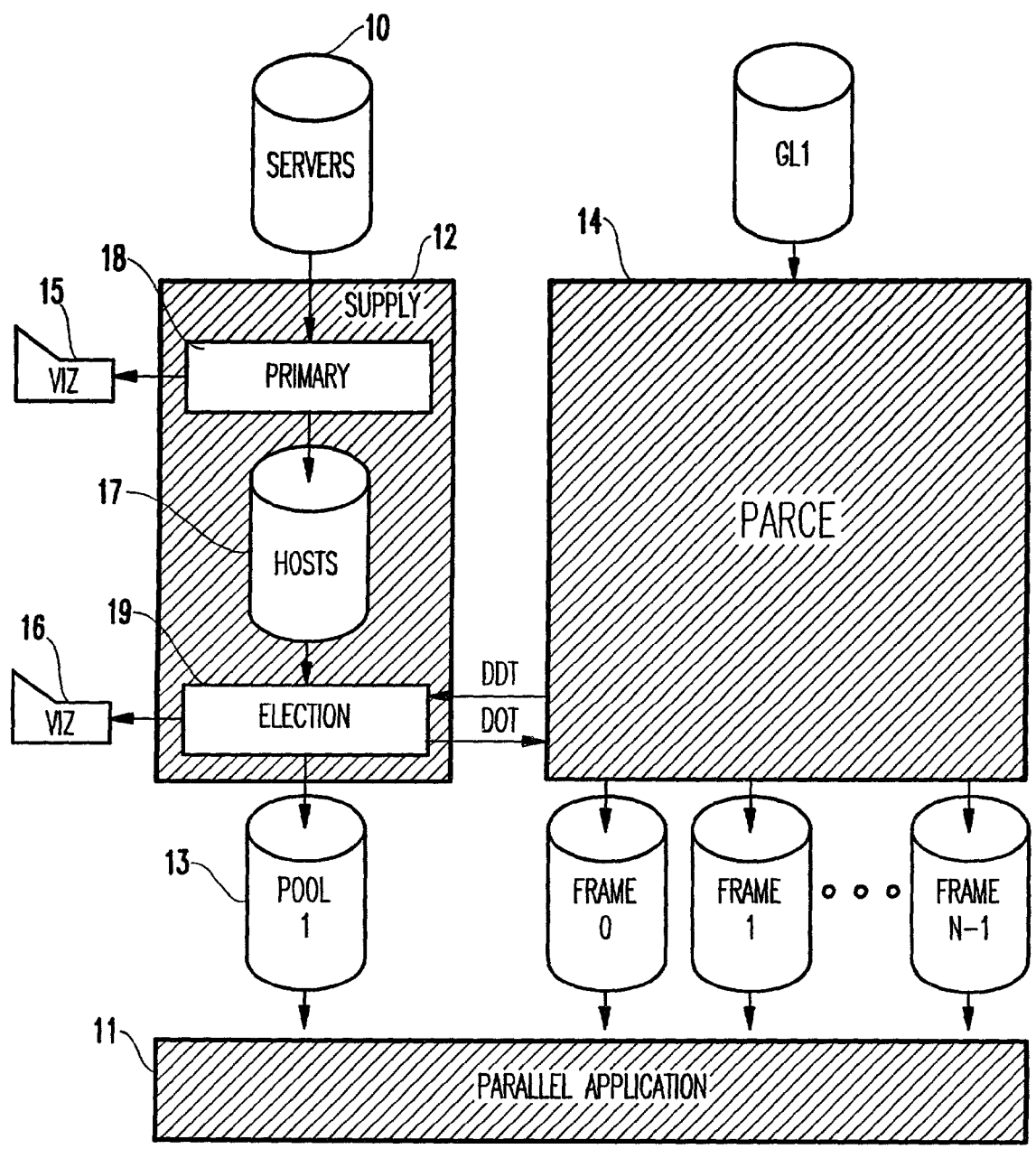
FIG. 1 is a block diagram showing an exemplary embodiment of the invention, including exemplary interfaces with a ParCE module.
Figure 5:
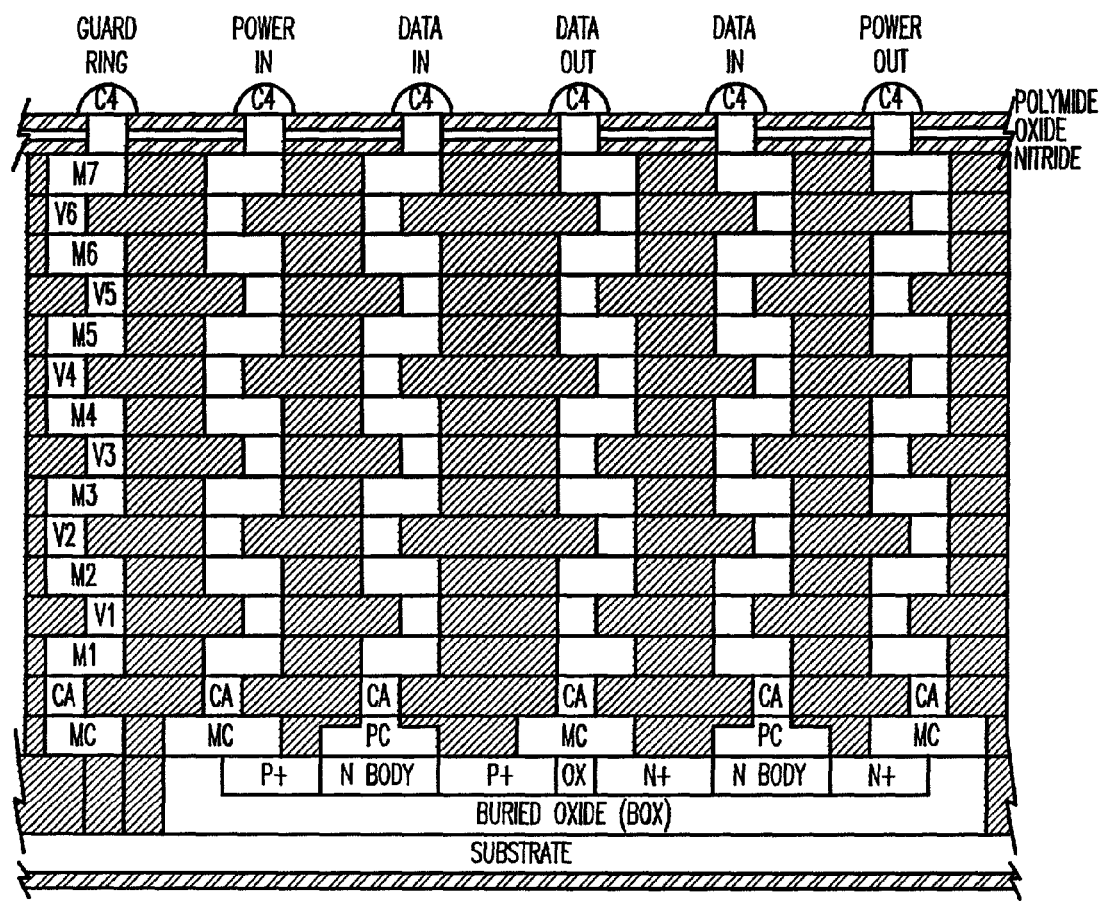
FIG. 5 is an exemplary simplified cross-section of an integrated circuit representation in ParCE.
Figure 5:
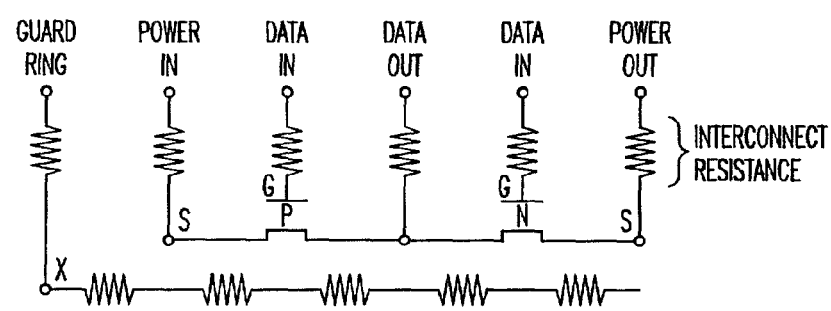

To better explain the interface shown in FIG. 1 with ParCE, an integrated circuit (IC) such as a microprocessor can be described in a physical sense as a three-dimensional block as exemplarily shown in FIG. 5. The electrical signals are connected to the "top" of the block, transferred "down" and through the block to the transistors that occupy a plane and perform the function of the IC and rest upon a "lower" substrate, and subsequently returned to the top of the block through a series of wiring planes. These wiring planes are shared by the three "signal types" of an IC, power signals (supply voltages and ground voltages), clock signals, and data/control signals. These signals pass from the electrical contacts down to the transistors, through various components of the transistors, then back to the electrical contacts, all by means of a series of superimposed and electrically insulated conductors. These planes are a laminate of "grids" and intervening "vias", each having electrical resistance and capacitance.

This physical structure can be expressed in a graphics language such as GL/1 that is recorded in a file. Such files involve massive amounts of data. In order to manage this data, a program was developed by the inventors called Parallel Chip Enable, or ParCE, by which the physical structure of an IC is geographically decomposed for subsequent parallel applications, as described further in assignee's copending application under attorney docket BUR9-2000-0027-US1. ParCE uses the GL/1 file, as can be seen in FIG. 1.

ParCE itself is a scalable parallel application. A novel metric, the data density, is computed for the design data. Data density is instantiated in a matrix that summarizes the bytes required to represent physical locations on the IC. This matrix is decomposed into p partitions. The decomposition respects the IC hierarchy, the geographic placement of IC cells, or building blocks, as well as the balance in terms of a homogeneous network. ParCE is successful because of its scalable design, its use of minimal representative informational components, its efficient hierarchical traversals, and its smart, collective communication using Message Passing Interface (MPI).

The present invention can be related to ParCE, as illustrated by the interface shown in FIG. 1. The initial GL/1 file is divided into a number of smaller Frame files. This is accomplished by means of a control protocol that uses the data density table (DDT) and the data ownership table (DOT). The present invention is itself a parallel application, and is comprised of module Supply 12 having two software modules.

The first, called Primary, searches a servers file 10 and identifies which servers as identified in this file are hosts. The computational resources of these hosts are tabulated. The second part, called Election, receives the data density table (DDT) specification from ParCE, chooses one or more hosts to satisfy the DDT, returns the data ownership table (DOT) to ParCE, and generates the pool file 13, which is a listing of one or more hosts to process the application program.

The present invention proposes that a computer system can be characterized by four properties: CPU, main memory, temporary file space, and cache memory page space. In an exemplary embodiment of the present invention, these properties are grouped as an "ordered-set"<CPU, memory, temporary file, cache>, i.e., a vector having four components.

For the purpose of the present invention, these properties have the corresponding dimensions and units as summarized in the following table. All units are greater than zero.

| Property | dimension | unit |
| --- | --- | --- |
| CPU | CPU | none |
| Memory | data | bytes |
| temporary file | data | bytes |
| page space | data | bytes |

This ordered-set are used in three vector equations: Capacity, Utilization, and Supply.

Capacity is defined as the physical configuration of a computer and is typically constant over long periods of time. Of course, a property such as memory may be changed occasionally. In that case, it will be detected and accounted for by the present invention. So capacity is constant and represents the availability of these properties that are constant in time.

$$\overrightarrow{\text{capacity}} = \langle \text{CPU, memory, temporary file, cache} \rangle \quad (14)$$

where capacity is initialized at time=$t_0$, and is considered constant over a sampling period T. Capacity is shown in vector format having four components.

Utilization, on the other hand is variable and represents the use of these properties that vary with time, again in vector format.

$$\overrightarrow{\text{utilization}}(t) = \langle \text{CPU}(t), \text{memory}(t), \text{temporary file}(t), \text{cache}(t) \rangle. \quad (13)$$

It is noted that 0≦Utilization≦Capacity.

Finally, supply (time) is defined to be the normalized and, so, unitless difference of capacity and utilization(time).

$$\overrightarrow{\text{supply}}(t) = \frac{\text{capacity} - \text{utilization}(t)}{\text{capacity}}. \quad (14)$$

Supply($\tau$) is an ordered-set of scalars, i.e., a vector, which represents "fraction-of-supply", having components as follows:

$$\frac{\text{CPU utilization}}{\text{CPU capacity}}, \frac{\text{memory utilization}}{\text{memory capacity}},$$

$$\frac{\text{temporary file utilization}}{\text{temporary file capacity}}, \frac{\text{cache utilization}}{\text{cache capacity}}$$

It is noted that $0 \leq \text{Supply} \leq 1$. As in equation (6) above, a unit ratio $\tau$ is also defined, $\tau = \text{time/Period} = t/T$ so that $0 < \tau < 1$.

Per the discussion above, the present invention also proposes a unitless metric called computational supply cost, so that $0 < \text{Cost} \leq 1$. Cost is used in the present invention to rank a computer in terms of its properties over time, where Supply $\uparrow \Rightarrow$ Cost $\downarrow$, and that its time-rate of change is inversely proportional to computational supply. That is $d(\text{Cost})/dt \propto^{-1} 1/\text{Supply(time)}$ which is integrated to evaluate the supply cost of a host processor over a time-period T. Thus, $$\text{Cost}(t) = 1 - \int_{t_0}^{T} \text{Supply}(\tau) d\tau. \qquad (4)$$

In a preferred implementation these equations are executed in the straight forward manner shown in the flowchart of the Primary module, as illustrated in FIG. 7. The lower diagram in FIG. 7 shows how the variable Supply could vary in time over a sampling period T.

Returning briefly to FIG. 1 showing a simplified data-flow of the Supply program and its relation to the ParCE program, the software module Supply is itself a parallel program operating under the IBM Parallel Operating Environment (POE) or the Argonne National Laboratory MPICH. The Supply program has two major routines, Primary and Election, each of which has an associated "visualizer" 15, 16 to demonstrate results. Also shown are three files, Servers 10, Hosts 17, and Pool 13. The Servers file 10 lists all the servers available within a computer network, including computers, workstations, printers, fax machines, etc., including the "address" of each server. The Servers file is processed by the Primary function 18 to produce the Hosts file 17. This is done by one or more computers testing the servers by means of a series of Operating System commands, as is well known in the art (see, for example, IBM Publication SC23-4115-00 IBM AIX Command Language Reference, IBM Corporation, 1997).

By means of this process, the hosts and their properties are identified and listed in the Hosts file 17. The Hosts file lists a subset of the Server file, namely those servers that are host computers that are available for use. The Hosts file 17 is then processed by the Election routine 19 to produce the Pool file 13, which is a subset of the Hosts file 17, and lists those hosts selected by the Election routine 19 to process the application. In this exemplary embodiment, this selection is based on a control protocol between Supply 12 and ParCE 14. ParCE generates the data density table (DDT) for Supply, and receives the data ownership table (DOT). The ParCE program produces the Frame files, each of which is a portion of the original GL/1.

Figure 6:
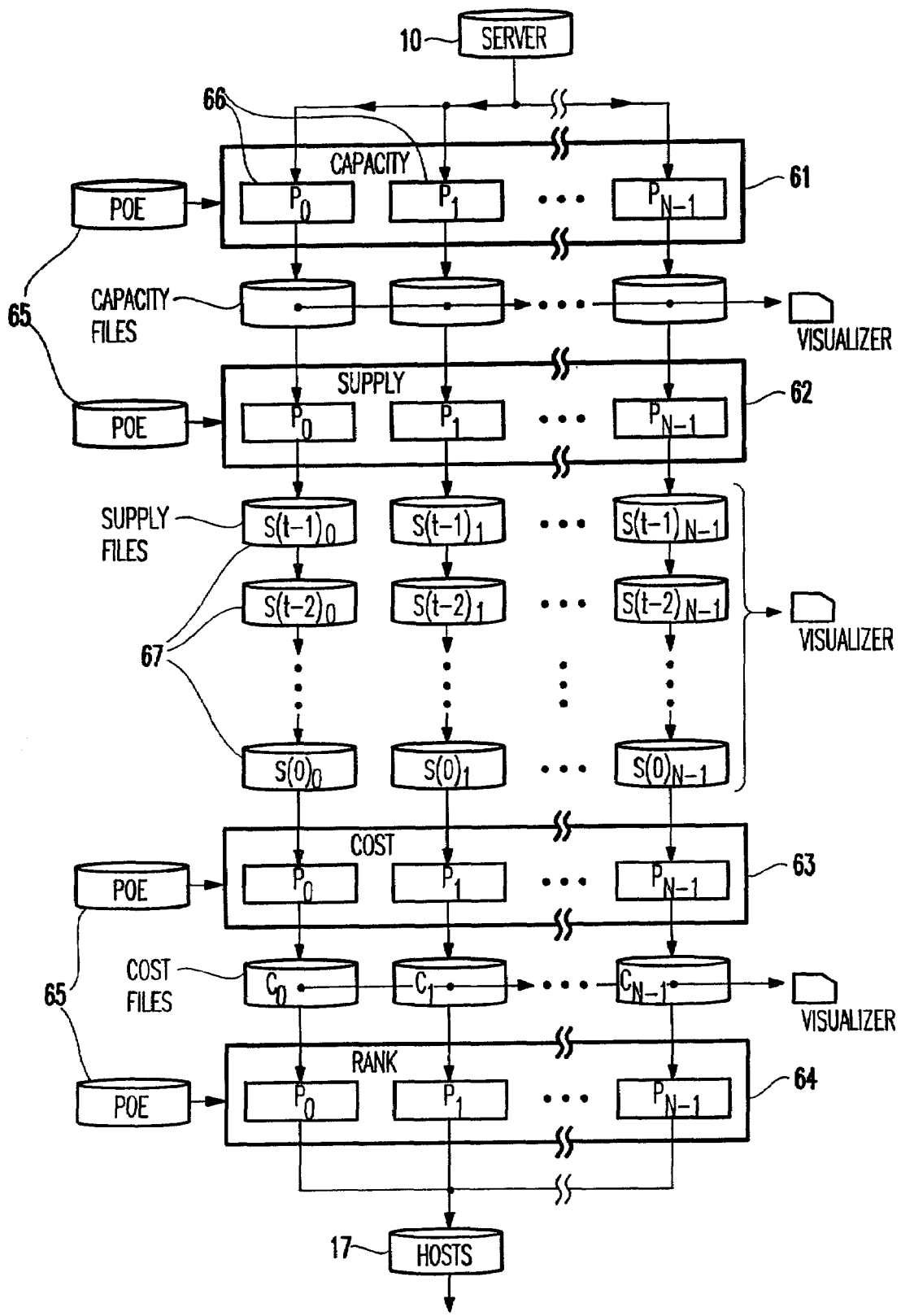
FIG. 6 is a data flow diagram illustrating a preferred exemplary embodiment of the present invention.

FIG. 6 is simplified data-flow of the Primary routine 18 having four subroutines: Capacity 61, Supply 62, Value 63, and Rating 64. As Supply 12 is implemented as a parallel program in this exemplary embodiment, each subroutine is actually being done in parallel individually by N processors 66 ($P_0, P_1, \ldots, P_{n-1}$) that are part of the network under control of POE 65 ("Parallel Operating Environment"). POE is one example of an operating system that sets up and manages network parallel processing capability. The subroutine Capacity 61 accesses the Server file 10, so that each processor $P_1$ reads a successive portion of this file. Each "record" in this file is generally of the form: server name, server network address, other information (see item [1] in FIG. 7). Using the network, each processor $P_1$, $i=0, \ldots N-1$, interrogates its assigned servers to determine which servers are hosts, and makes an entry in its respective Hosts file of the following (vector) form: server name, number of CPUs, total memory, total cache space, total page space (see item [2] in FIG. 7).

Thus, a selected number of N computers 66 on the network are independently processing the Capacity subroutine 61 to analyze, separately and as a parallel process controlled by POE 65, the technique of the present invention to develop an optimal listing of hosts to participate in parallel application 11. Each computer $C_1$ performs an analysis with a different listing of possible hosts from the Servers file 10. The number of possible hosts is re-balanced so as to balance the subsequent work load of each individual computer $C_1$. In general, this calculation by these N computers will be done concurrently with the processing of the parallel application program, which is to say, that the present invention provides a real time listing of preferred computer resources to perform the parallel application program.

Next, as shown in FIG. 6, each computer $C_1$ processor Pi, again by means of certain operating system commands, under control of POE, causes in the SUPPLY subroutine 62 for each host to reveal its current utilization of resources (see item [3] of FIG. 7). Each computer $C_1$ processor performs the calculation $$\text{Supply}(\tau) = \frac{\text{Capacity} - \text{Utilization}(\tau)}{\text{Capacity}}$$

for its respective hosts listing (item [4] in FIG. 7).

At this point, the Supply routine is "initialized" to be time $t_0$. Next, the utilization, supply, cost, and rank calculations of each possible host is made by its respective processor over a time period T (see 67 in FIG. 6 and items[3a]-[6a] in FIG. 7).

As shown in FIG. 6, the Cost subroutine 63 is executed at the end of each period (see item 5a in FIG. 7). The waveform at the bottom of FIG. 7 shows a possible typical supply function over a period T.

Figure 7A:
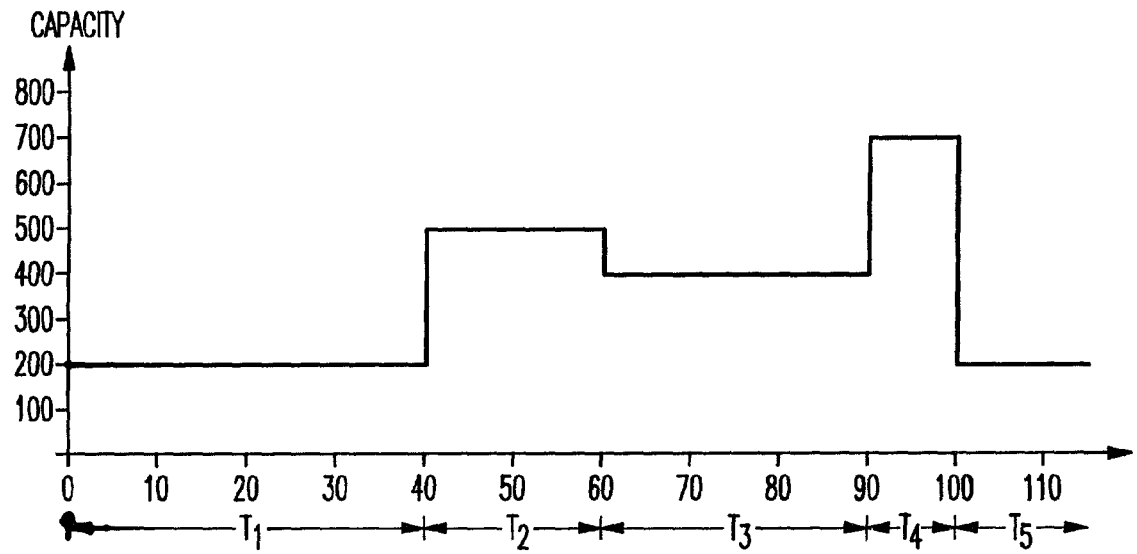
Figure 7B:
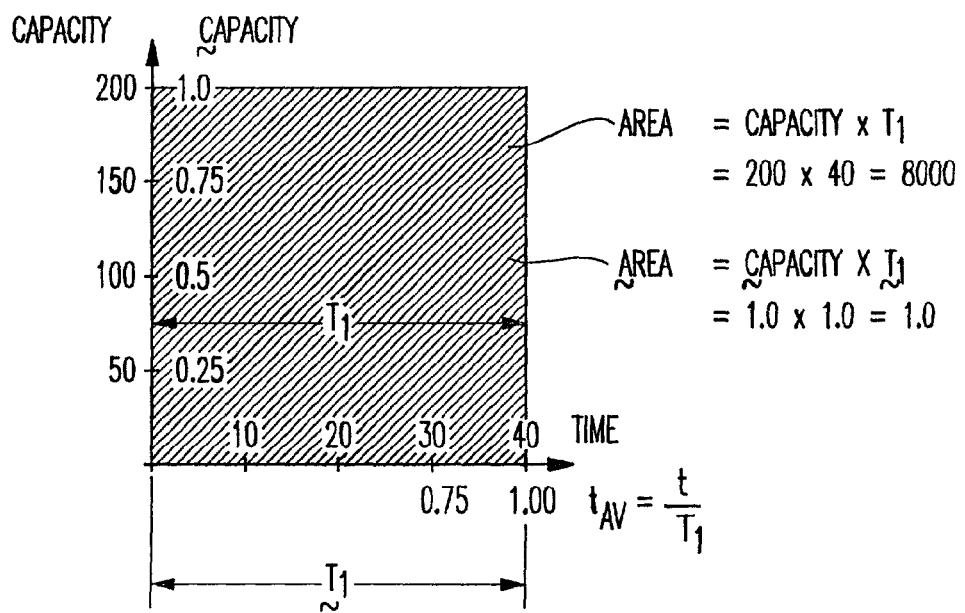
Figure 7C:
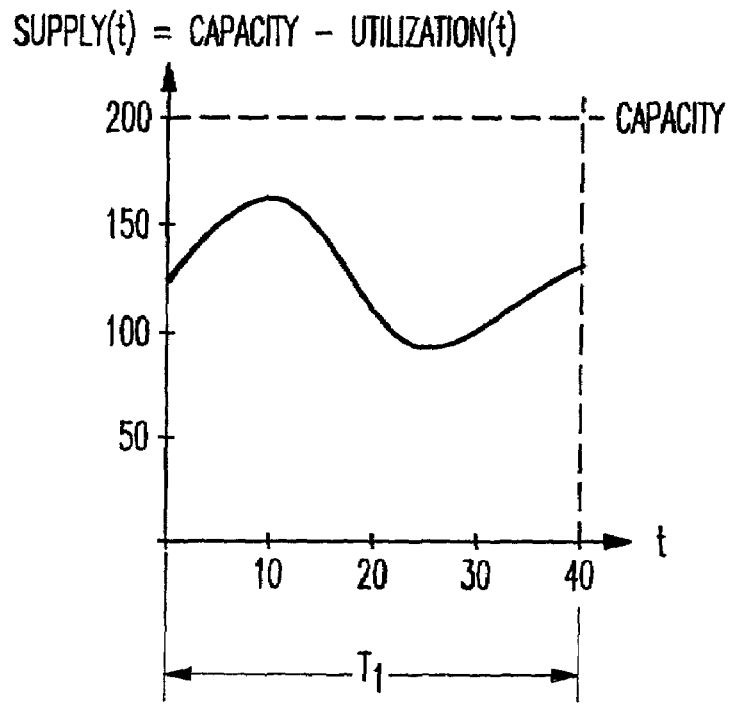
Figure 7D:
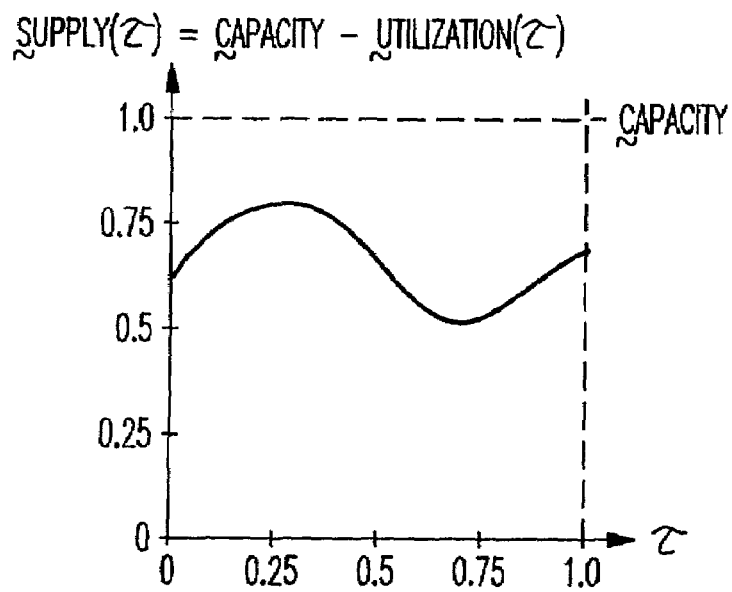

FIGS. 7A through 7F further demonstrate the concept of normalization of a preferred embodiment. The periods $T_i$'s in FIG. 7A are in time intervals appropriate for the processing of the parallel program and could be in units of minutes, hours, days, etc. FIG. 7B illustrates the normalization of period $T_1$. In FIG. 7B, the $\sim$ symbol indicates the normalized equation, as also illustrated in FIGS. 7D and 7F.

Figure 9:
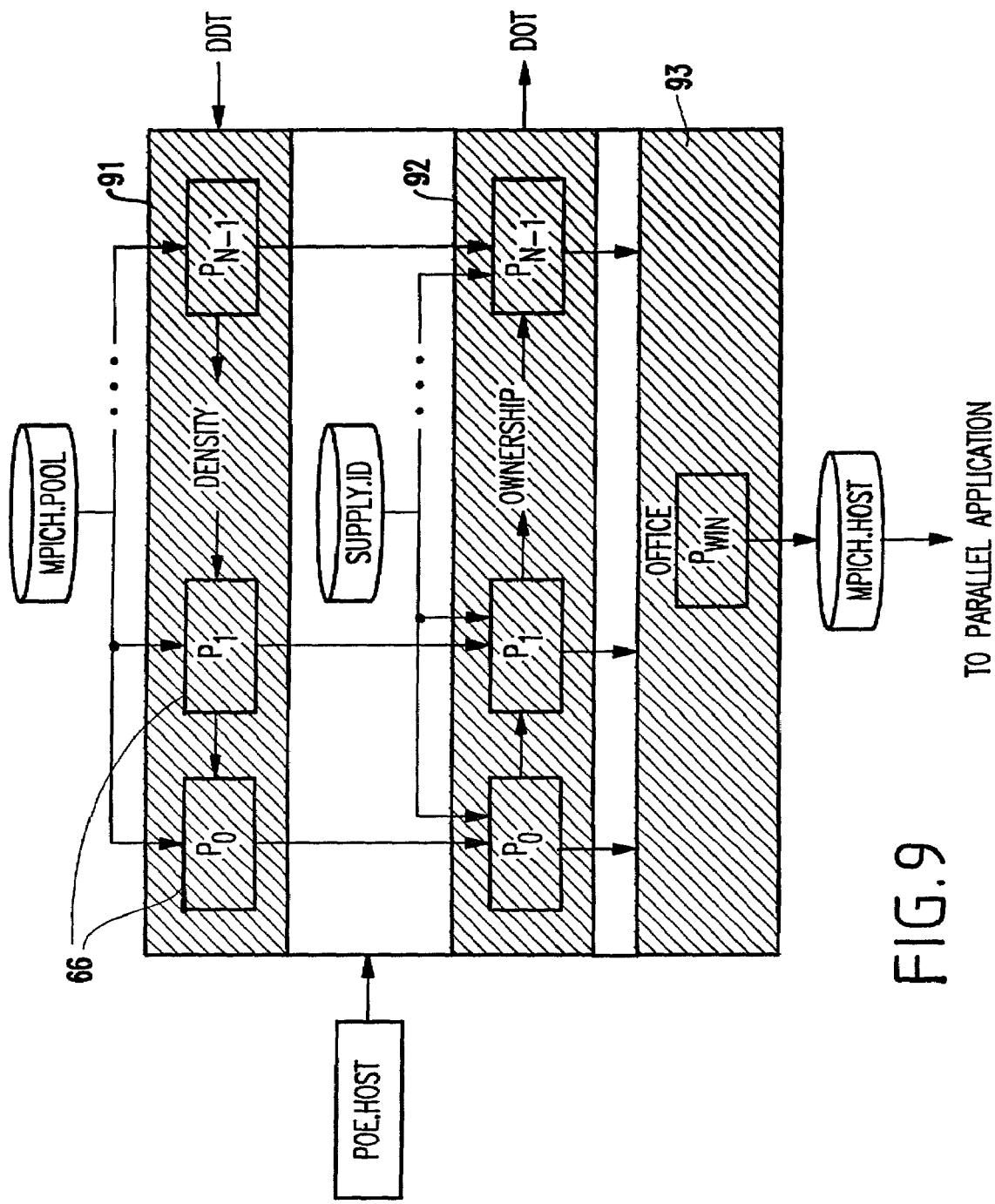
FIG. 9 shows the interfaces of the three subroutines used in the Election module of a preferred exemplary embodiment.

FIG. 8 is a block diagram showing the interfaces of the Election routine 19, and FIG. 9 is a simplified data-flow of the Election routine. Similar to processing of Primary module 18, Election module 19 is executed as a parallel application by N processors $P_1$ of computers $C_1$ from the network (reference 66 on FIG. 9), under control of POE. Election is comprised of the Density, Ownership, and Office subroutines 91-93. In the Density subroutine 91, each processor receives a copy of the Data Density Table (DDT), which is an m×n matrix, where each element in the matrix is a positive integer that represents the corresponding data density of the GL/1 model of an integrated circuit, simplistically shown in FIG. 5.

Next, in the Ownership module 92, using the Supply file that which lists the resources for all the hosts, each processor proceeds to "fill" its respective Data Ownership Table (DOT) by selecting the "least costly" hosts, as indicated by the value file. This selection also can be influenced by using the history provided by the Supply file to predict the cost and supply of a particular host, based on its behavior at this time the previous day or some other time interval, as suggested by box diagram information shown in FIG. 2.

As discussed earlier, this statistical information can provide a basis on how the cost-of-supply of each computer is ranked by a sorting of their box functions to influence the host selection process by, for example, testing the instantaneous value of supply (τ) against its median box value. If the instantaneous value is in the box, then that computer is behaving in a predictable manner at that instant. If outside the box, an unexpected change in computer activity has occurred and another computer is selected from the pool.

Finally, Office subroutine 93 selects the DOT with the smallest number of hosts used to complete the DOT and returns this DOT to the ParCE routine. The selected listing of hosts $P_{WTN}$ is loaded into MPICH.HOST to be used as the listing of hosts to perform the parallel application.

FIG. 10 illustrates a typical hardware configuration of an information handling/computer system in accordance with the invention and which preferably has at least one processor or central processing unit (CPU) 1011.

The CPUs 1011 are interconnected via a system bus 1012 to a random access memory (RAM) 1014, read-only memory (ROM) 1016, input/output (I/O) adapter 1018 (for connecting peripheral devices such as disk units 1021 and tape drives 1040 to the bus 1012), user interface adapter 1022 (for connecting a keyboard 1024, mouse 1026, speaker 1028, microphone 1032, and/or other user interface device to the bus 1012), a communication adapter 1034 for connecting an information handling system to a data processing network, the Internet, an Intranet, a personal area network (PAN), etc., and a display adapter 1036 for connecting the bus 1012 to a display device 1038 and/or printer 1039 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 1011 and hardware above, to perform the method of the invention.

This signal-bearing media may include, for example, a RAM contained within the CPU 1011, as represented by the fast-access storage for example. Alternatively, the instructions may be contained in another signal-bearing media, such as a magnetic data storage diskette 1100 (FIG. 11), directly or indirectly accessible by the CPU 1011.

Whether contained in the diskette 1100, the computer/CPU 1011, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A computer-implemented method determining a listing of hosts on a network to perform a parallel application, said method comprising:
   determining a listing of all possible hosts on said network for performing said parallel application;
   determining, for each of said possible hosts, a current capacity and a current utilization;
   calculating, for each of said possible hosts, a difference between said current capacity and said current utilization; and
   selecting from said listing of all possible hosts a listing of hosts based on sorting said calculated differences,
   wherein said selecting a listing of hosts from said listing of all possible hosts further comprises a quantification of a history of each said possible host and a consideration of said history in said selecting of a listing.

2. The method of claim 1, wherein said determination of a listing of processors is itself a parallel processing application.

3. The method of claim 1, wherein said determination of a listing of processors is executed in real time concurrently with said parallel application.

4. The method of claim 1, further comprising:
   providing said selected listing of hosts to an operating system controlling an execution of said parallel application.

5. The method of claim 1, wherein said calculating a difference between current capacity and a current utilization further comprises:
   normalizing said difference.

6. A computer readable storage medium embodying a program of machine-readable instructions executable by a digital processing apparatus to determine a listing of hosts on a network to perform a parallel application, said machine-readable instructions comprising:
   determining a listing of all possible hosts on said network for performing said parallel application;
   determining, for each of said possible hosts, a current capacity and a current utilization;
   calculating, for each of said possible hosts, a difference between said current capacity and said current utilization; and
   selecting from said listing of all possible hosts a listing of hosts based on sorting said calculated differences,
   wherein said selecting a listing of hosts from said listing of all possible hosts further comprises a quantification of a history of each said possible host and a consideration of said history in said selecting of a listing.

7. The signal-bearing medium of claim 6, wherein said machine-readable instructions are provided to an operating system on said network such that said determination of a listing of processors is itself a parallel processing application.

8. The signal-bearing medium of claim 6, wherein said machine-readable instructions are provided to an operating system on said network such that said determination of a listing of processors is executed in real time concurrently with said parallel application.

9. The signal-bearing medium of claim 6, said machine-readable instructions further comprising:

providing said selected listing of hosts to an operating system controlling an execution of said parallel application.

10. The signal-bearing medium of claim 7, wherein said calculating a difference between current capacity and a current utilization further comprises:

normalizing said difference.

11. A computer network having a plurality of computation resources and an operating system for executing a target parallel application process using at least a subset of said plurality of computation resources, wherein said network includes a method to determine a listing of said computation resources to perform said target parallel application process, said method comprising:

determining a listing of all possible said computation resources on said network for performing said parallel application;

determining, for each of said possible computation resources, a current capacity and a current utilization;

calculating, for each of said possible computation resources, a difference between said current capacity and said current utilization; and selecting from said listing of all possible computation resources a listing of computation resources based on sorting said calculated differences as said at least a subset of said plurality of computation resources to execute said target parallel application process, wherein said selecting a listing of hosts from said listing of all possible hosts further comprises a quantification of a history of each said possible host and a consideration of said history in said selecting of a listing.

12. The computer network of claim 11, wherein said method interfaces to an operating system on said network such that said determination of a listing of computation resources is itself a parallel processing application.

13. The computer network of claim 11, wherein said method interfaces to an operating system on said network such that said determination of a listing of computation resources is executed in real time concurrently with said parallel application.

14. The computer network of claim 11, said method further comprising:

providing said selected listing of computation resources to an operating system controlling an execution of said parallel application.

15. The computer network of claim 11, wherein said calculating a difference between current capacity and a current utilization further comprises:

normalizing said difference.

16. A computer network having a plurality of computation resources and an operating system for executing a target parallel application process using at least a subset of said plurality of computation resources, wherein said network includes a method to determine a listing of said computation resources to perform said target parallel application process, said method comprising:

means for determining a listing of all possible said computation resources on said network for performing said parallel application;

means for determining, for each of said possible computation resources, a current capacity and a current utilization;

means for calculating, for each of said possible computation resources, a difference between said current capacity and said current utilization; and means for selecting from said listing of all possible computation resources a listing of computation resources based on sorting said calculated differences to be said at least a subset of said computation resources for executing said target parallel application process, wherein said selecting a listing of hosts from said listing of all possible hosts further comprises a quantification of a history of each said possible host and a consideration of said history in said selecting of a listing.

17. The computer network of claim 16, wherein said method interfaces to an operating system on said network such that said determination of a listing of computation resources is executed in real time concurrently with said parallel application.

* * * * *